(12) United States Patent
Elliott et al.

(10) Patent No.: US 8,481,878 B2
(45) Date of Patent: Jul. 9, 2013

(54) DEVICES AND METHODS RELATED TO BATTERY MODULES

(76) Inventors: Daniel J. Elliott, Rancho Cucamonga, CA (US); W. Jeff Ulrich, Dearborn, MI (US); Rick Reinhard, La Crescenta, CA (US); David Weinberger, Rancho Santa Margarita, CA (US); David Edgar, Los Alamitos, CA (US)

( * ) Notice: Subject to any disclaimer, the term of this patent is extended or adjusted under 35 U.S.C. 154(b) by 274 days.

(21) Appl. No.: 12/802,121

(22) Filed: May 27, 2010

(65) Prior Publication Data
US 2011/0011716 A1 Jan. 20, 2011

Related U.S. Application Data

(60) Provisional application No. 61/217,288, filed on May 28, 2009.

(51) Int. Cl.
*H01H 3/40* (2006.01)

(52) U.S. Cl.
USPC .......................................................... 200/339

(58) Field of Classification Search
USPC ................. 200/552, 553, 556–57, 572, 48 A, 200/48 R, 253.1, 252–260; 439/700, 188
See application file for complete search history.

(56) References Cited

U.S. PATENT DOCUMENTS

| | | | | |
|---|---|---|---|---|
| 2,508,778 A * | 5/1950 | Spears | .......................... | 439/479 |
| 3,020,368 A * | 2/1962 | Nielsen | ......................... | 200/86.5 |
| 3,138,688 A * | 6/1964 | Kolm et al. | .................... | 200/572 |
| 3,187,120 A * | 6/1965 | Akst | ............................ | 200/16 A |
| 3,438,662 A * | 4/1969 | Cowal et al. | ..................... | 403/27 |
| 3,703,617 A | 11/1972 | Burnett | | |
| 3,997,749 A | 12/1976 | Hanagan | | |
| 4,191,868 A * | 3/1980 | Sunde | .......................... | 200/61.5 |
| 4,582,352 A * | 4/1986 | Filter et al. | ..................... | 294/174 |
| 4,798,968 A * | 1/1989 | Deem | .......................... | 307/10.7 |
| 5,066,840 A * | 11/1991 | Wiktor et al. | ................. | 200/330 |
| 5,096,438 A * | 3/1992 | Black | ............................ | 439/478 |
| 5,562,490 A * | 10/1996 | Rybolt et al. | ................. | 439/507 |
| 5,574,316 A * | 11/1996 | Nieschulz | .................... | 307/10.7 |
| 5,700,165 A * | 12/1997 | Harris et al. | ............. | 439/620.26 |
| 5,864,106 A | 1/1999 | Hartwig et al. | | |
| 6,261,123 B1 * | 7/2001 | Kruger et al. | ................. | 439/511 |
| 6,941,639 B2 | 9/2005 | Uemoto et al. | | |
| 7,211,756 B2 * | 5/2007 | Balaban et al. | ............... | 200/339 |
| 7,244,148 B2 * | 7/2007 | Maguire et al. | .......... | 439/620.28 |
| 7,466,103 B2 | 12/2008 | Suzuki et al. | | |
| 7,479,040 B2 | 1/2009 | Cho | | |
| 7,504,178 B2 | 3/2009 | Shimamura et al. | | |
| 7,682,206 B2 * | 3/2010 | Kainz | ........................... | 439/824 |
| 2006/0019541 A1 | 1/2006 | Maguire et al. | | |

* cited by examiner

*Primary Examiner* — Briggitte R Hammond
(74) *Attorney, Agent, or Firm* — Jeffrey A. McKinney; McKinney Law Group

(57) ABSTRACT

The present invention relates to devices that may be used in conjunction with one or more battery modules and related methods. More particularly, the present invention relates to a devices and related methods allowing one to manually disconnect high voltage and high current devices from a system. In one aspect, the present invention provides a mid pack break. The mid pack break is able to manually disconnect high voltage and high current devices from a system. The mid pack break includes a handle, a pin, a first sleeve, and a second sleeve. Force exerted on the handle causes the pin to insert into the first and second sleeves, thereby completing an electrical connection between the first and second sleeves.

2 Claims, 6 Drawing Sheets

DEVICES AND METHODS RELATED TO BATTERY MODULES

This application claims priority from U.S. provisional application Ser. No. 61/217,288 filed on May 28, 2009, incorporated herein by reference in its entirety.

FIELD OF THE INVENTION

The present invention relates to devices that may be used in conjunction with one or more battery modules and related methods. More particularly, the present invention relates to a devices and related methods allowing one to manually disconnect high voltage and high current devices from a system.

BACKGROUND OF THE INVENTION

Large format batteries are typically constructed in modular form. One must first determine what the power and energy storage requirements are for a large format battery or pack; one then designs the battery/pack using available building blocks (i.e., modules). The modules are, in turn, engineered to meet a number of specifications related to the typical battery pack a particular manufacturer produces.

There have been many reports of battery module designs. Examples of such reports include: U.S. application Ser. No. 10/259,122; U.S. application Ser. No. 10/961,232; U.S. application Ser. No. 11/300,306; and, U.S. application Ser. No. 11/434,864.

U.S. application Ser. No. 11/259,122 discusses a battery case that is formed by justaposing a plurality of electrode plate group housing chambers. An electrolyte-impregnated electrode plast group is housed in each of the housing chambers. A side plate is arranged in abutment with each side face of the battery case. The respective side faces are faced with the openings of the electrode plate group housing chambers. This makes it possible to close the openings of the electrode plate group housing chambers. Thus, the cells and the battery module are fabricated concurrently.

U.S. application Ser. No. 10/961,232 discusses a battery module and a combination battery. In this module, the handling of unit cells is facilitated to enhance production efficiency while contributing to a downsized power source. The battery module includes laminate-sheathed cells as unit cells and a retention member for retaining the laminate-sheathed cells. The retention member is configured with a printed-wiring board printed with voltage measurement wirings for measuring voltages of the laminate-sheathed cells.

U.S. application Ser. No. 11/300,306 discusses a battery module including an output breaker that ensures safe and prompt installation of batteries in a system. The battery module includes one or more batteries and a case housing the batteries having output terminals. Each output terminal is connected to a positive or negative electrode of the housed battery. The battery module further includes means for turning on and off the connection between the output terminal and the positive or negative electrode of the battery. The means for turning on and off the connection may include a contact subjected to making and breaking operations and a screw for making and breaking the contact; the screw has an insulator at an interface with the contact.

U.S. application Ser. No. 11/434,864 discusses a battery module that combines a plurality of unit cells. The cells are mounted into a cap structure. The cap structure includes a circuit that electrically connects the unit cells.

Despite all the work that has been directed to battery modules, there exists a need for further, improved battery devices and methods that can be used in conjunction with the modules. That is one object of the present invention.

SUMMARY OF THE INVENTION

The present invention relates to devices that may be used in conjunction with one or more battery modules and related methods. More particularly, the present invention relates to a devices and related methods allowing one to manually disconnect high voltage and high current devices from a system.

In one aspect, the present invention provides a mid pack break. The mid pack break is able to manually disconnect high voltage and high current devices from a system. The mid pack break includes a handle, a pin, a first sleeve, and a second sleeve. Force exerted on the handle causes the pin to insert into the first and second sleeves, thereby completing an electrical connection between the first and second sleeves.

DETAILED DESCRIPTION OF THE INVENTION

The present invention relates to devices that may be used in conjunction with one or more battery modules and related methods. More particularly, the present invention relates to a devices and related methods allowing one to manually disconnect high voltage and high current devices from a system.

Devices and methods according to the present invention are discussed in terms of the FIGURES below.

Figure 1:
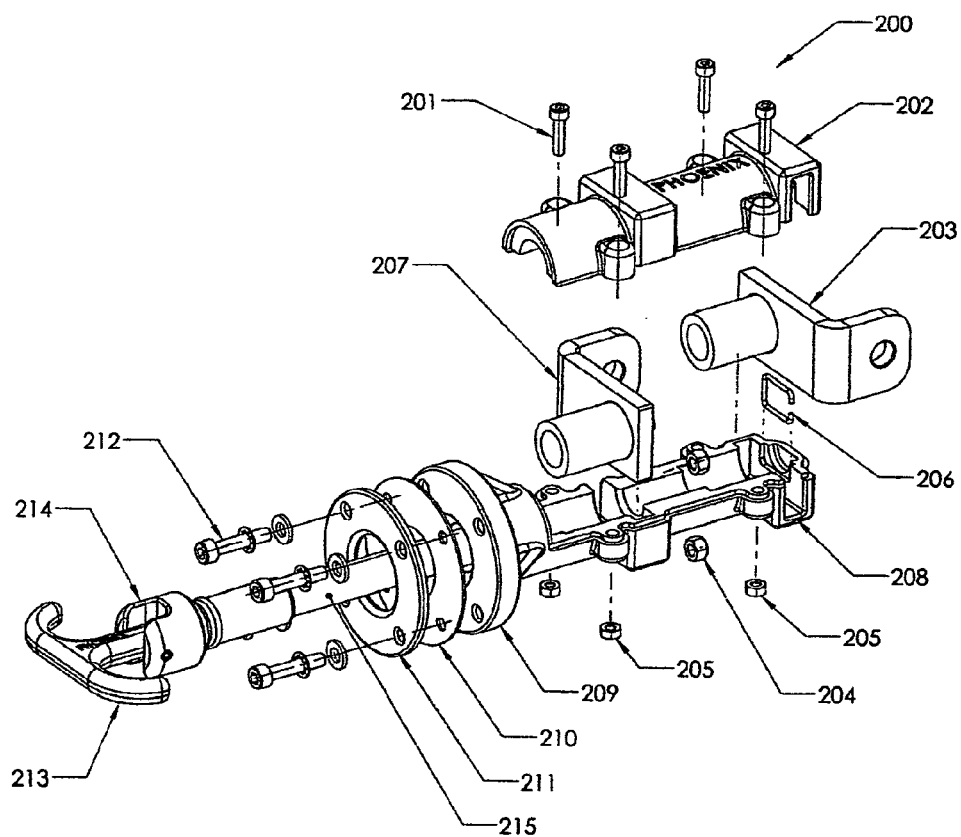
FIG. 1 shows an exploded view of a mid pack break or mechanical disconnect (200) according to the present invention.

FIG. 1 shows an exploded view of a mid pack break or mechanical disconnect (200) according to the present invention. Mid pack break 200 allows the safe, manual disconnection of high voltage and high current devices and/or batteries. One way in which it enables safety is that it contains any arching inside the connector and keeps it away from human or environmental contact. The need for such manual disconnection typically arises in the case of electrical failure or in the case where a secondary safety pack disconnect point is desired.

As shown, the elements of mid pack break 200 are as follows: fasteners (201, 204, 205, 212); body cover (202); spring socket connector (203); pin lock (206); spring socket connector (207); main body (208); main body mounting flange (209); gasket (210); retaining ring (211); pin handle (213); handle retainer (214); and conductive pin (215).

Figure 2:
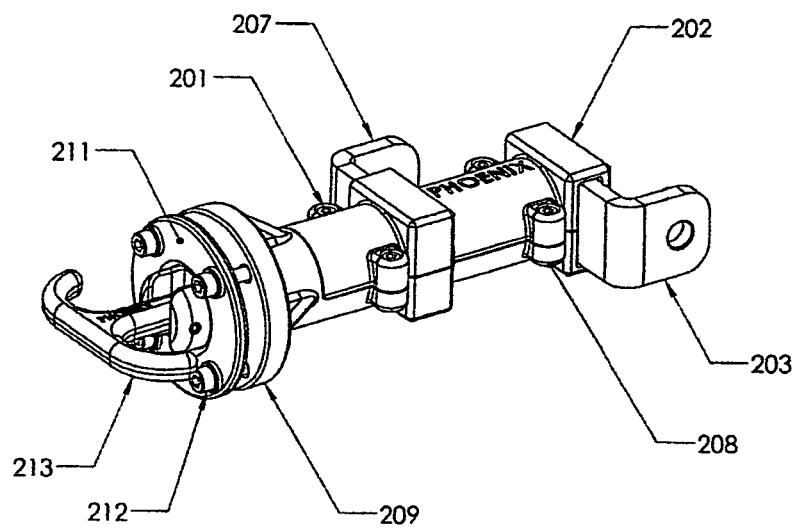
FIG. 2 shows a view of an assembled mid pack break or mechanical disconnect (200) according to the present invention.
Figure 3:
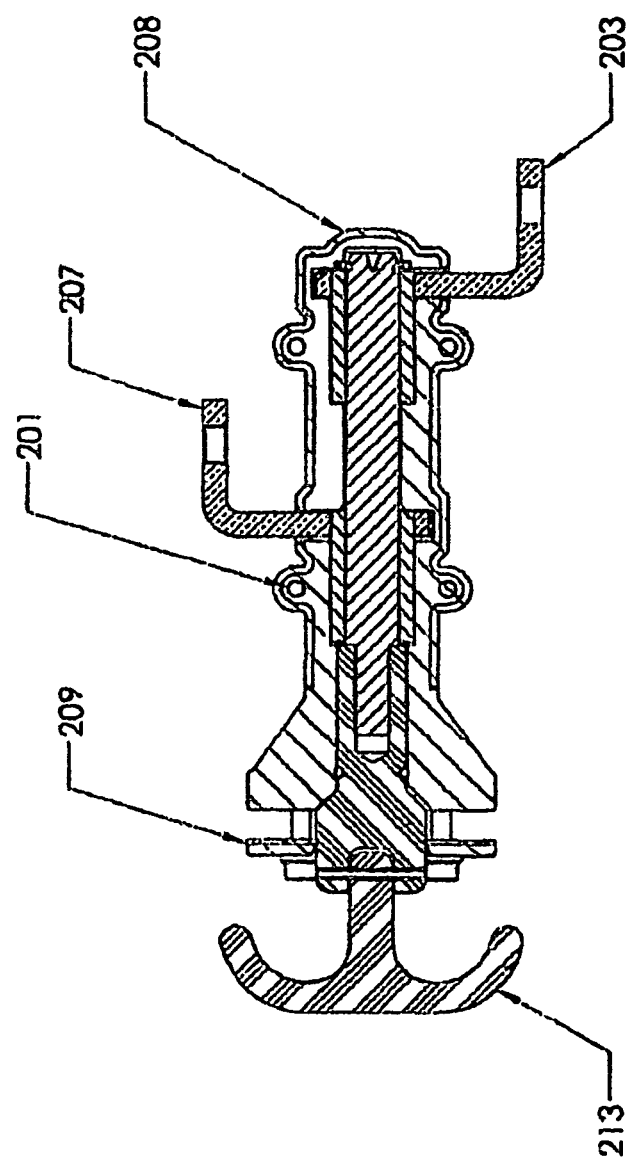
FIG. 3 shows a cross-section view of the mid pack break or mechanical disconnect (200) according to the present invention.

FIG. 2 shows a view of an assembled mid pack break or mechanical disconnect (200) according to the present invention. FIG. 3 shows a cross-section view of the mid pack break or mechanical disconnect (200) according to the present invention.

To operate mid pack break 200, one applies force handle 213, causing pin 215 to insert into sleeve 207 and 203. This completes an electrical connection between sleeves 207 and 203, thereby disconnecting the high voltage/current device to which it is connected. As shown, sleeves 203 and 207 are spring-type sleeve connectors, although a split sleeve connector can be used instead.

Figure 4:
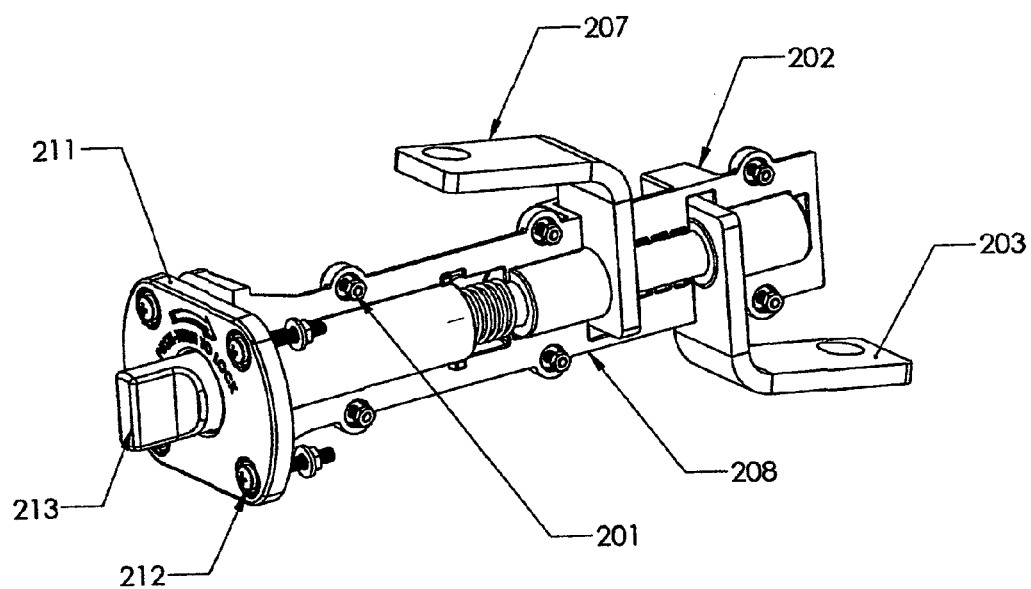
FIG. 4 shows a view of an embodiment of an assembled mid pack break or mechanical disconnect where the contact pin is captured within the switch.
Figure 5:
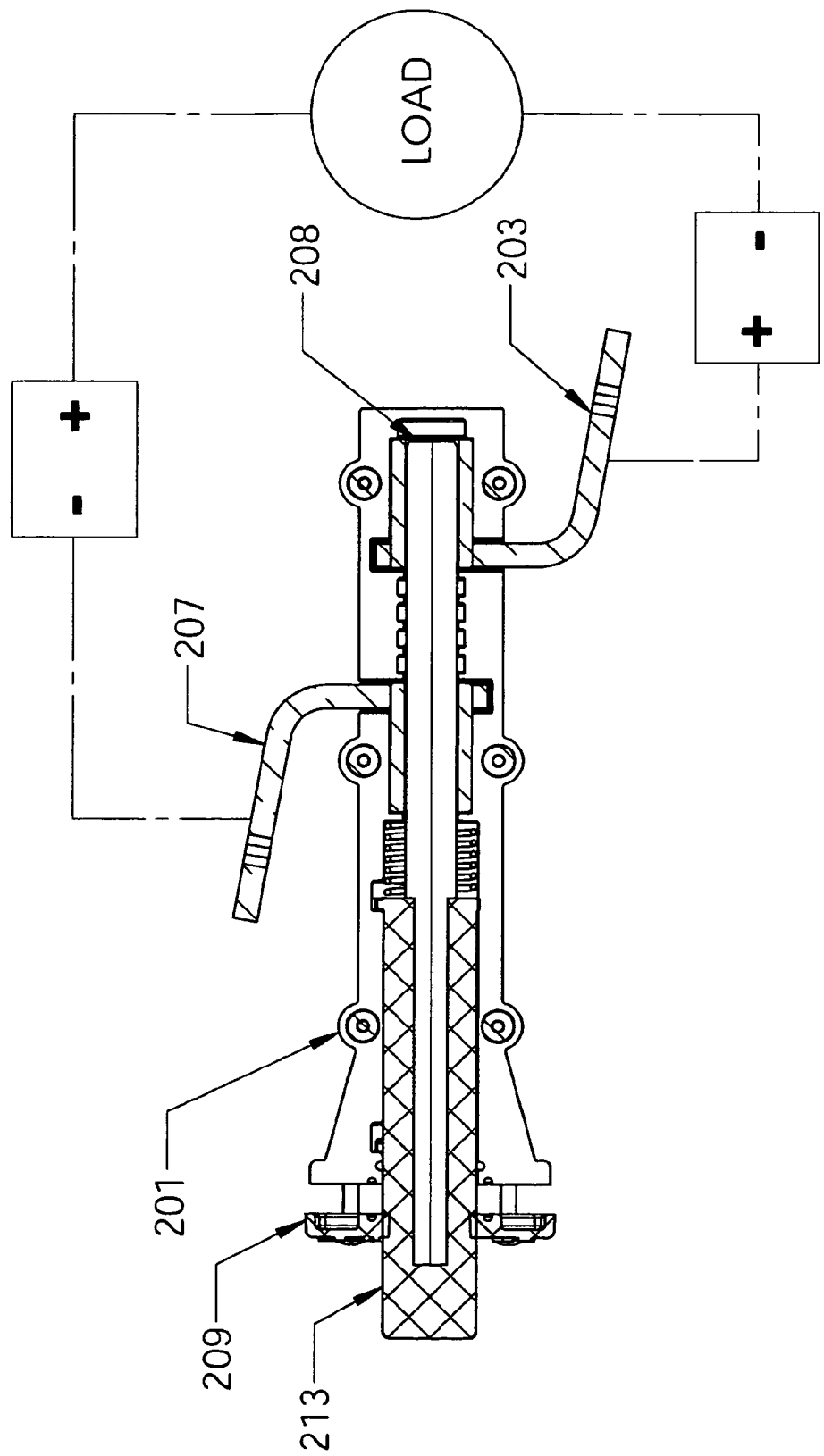
FIG. 5 shows a cross-section view of an embodiment of an assembled mid pack break or mechanical disconnect where the contact pin is captured within the switch.
Figure 6:
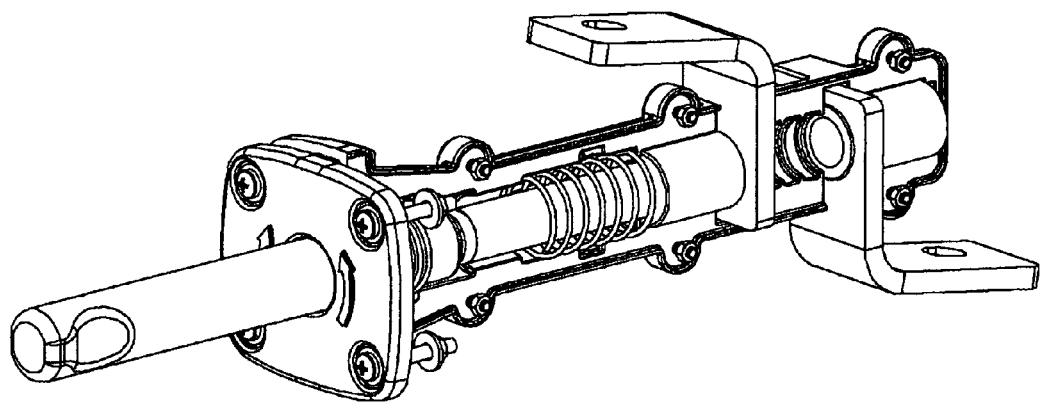
FIG. 6 shows an assembled view of an embodiment of an assembled mid pack break or mechanical disconnect where the contact pin is captured within the switch.

FIGS. 4-6 show various views of another embodiment of a mid-pack break or mechanical disconnect (previously numbered elements apply). In this embodiment, the conductive pin is captured within the switch. It is spring loaded to open and has closed position locking and open position locking to prevent accidental energizing. There is a locking detent that must be overcome in both the open and closed states.

The mid pack break or mechanical disconnect of the present invention may be used for any suitable purpose. In one case, it is used with large format battery packs including a number of modules. The modules may be based on any suitable chemistry, such as: lithium titanate, lithium iron phosphate, lithium iron magnesium phosphate, lithium polymer, and lithium nickel oxide. Large format packs have a number of uses, including connection to the electric grid for frequency regulation and/or peak shaving.

The invention claimed is:

1. A mid pack break for manually disconnecting high voltage and high current devices from a system, wherein the mid pack break comprises a handle, a pin, a first sleeve, and a second sleeve, wherein force exerted on the handle causes the pin to insert into the first and second sleeves, thereby completing an electrical connection between the first and second sleeves, wherein the first and second sleeves are spring type sleeve connectors, and wherein the first and second sleeves are mechanically connected to a main body to which the handle is connected, and wherein completing an electrical connection between the first and second sleeves serves to disconnect one or more high voltage and high current devices from a system.

2. A method of manually disconnecting a high voltage and high current device, wherein the method comprises the step of applying force to a handle of a mid pack break, wherein the mid pack break comprises a handle, a pin, a first sleeve, and a second sleeve, and wherein force exerted on the handle causes the pin to insert into the first and second sleeves thereby completing an electrical connection between the first and second sleeves, and wherein the first and second sleeves are spring type sleeve connectors, and wherein the first and second sleeves are mechanically connected to a main body to which the handle is connected, and wherein completing an electrical connection between the first and second sleeves serves to disconnect one or more high voltage and high current devices from a system.

* * * * *